Jan 6, 1931.  G. S. v. HEYDEKAMPF  1,787,525
DEVICE FOR TESTING MATERIALS
Filed May 3, 1929 2 Sheets-Sheet 1
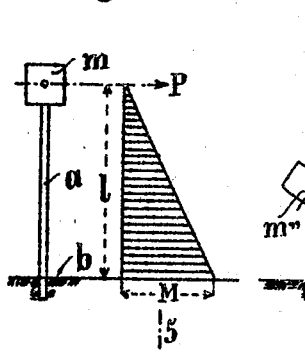
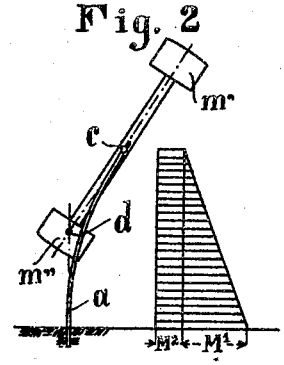
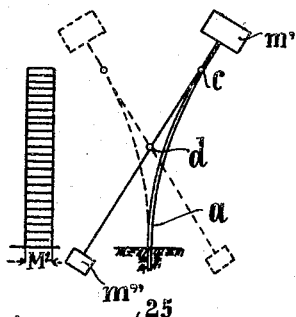
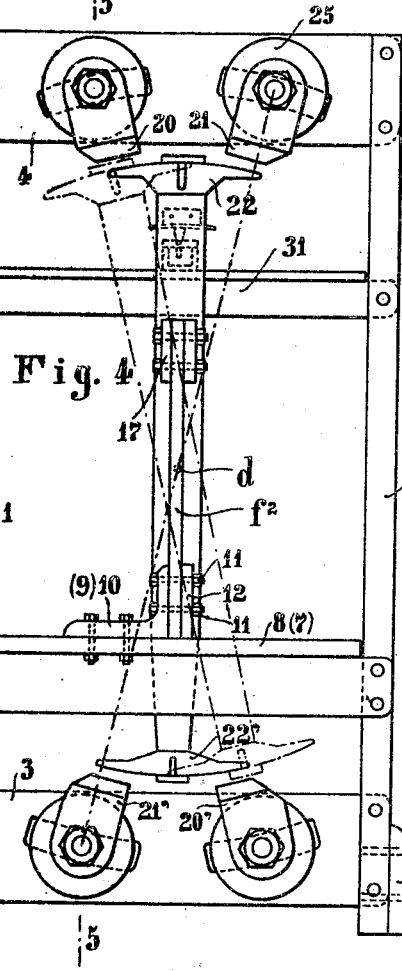
Inventor:
Gerd Stieler v. Heydekampf
attorney.

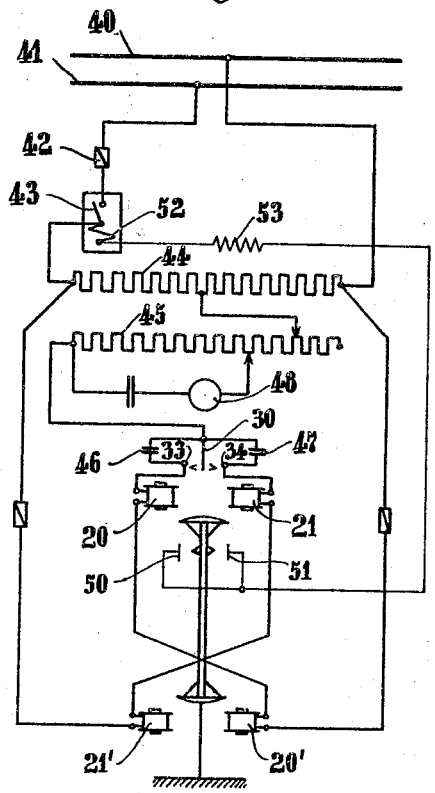

Patented Jan. 6, 1931

1,787,525

UNITED STATES PATENT OFFICE

GERD STIELER v. HEYDEKAMPF, OF BRUNSWICK, GERMANY, ASSIGNOR TO OTTO FOPPL, OF BRUNSWICK, GERMANY

DEVICE FOR TESTING MATERIALS

Application filed May 3, 1929, Serial No. 360,276, and in Germany May 21, 1928.

In the customary devices for producing oscillations of flexure based upon the number of natural oscillations, the test-piece (flat spring) is at one end secured and provided at the other end with a mass, the dimensions of which are small in proportion to the length of the test-piece. For this reason only a single force is mainly transferred from the test-piece to the mass, which is necessary for the parallel displacement of the mass, whilst the torsional moment, simultaneously transferred, is of a negligible quantity. In these arrangements the moment of flexure transferred into the test-piece varies over the whole length of the latter. At the end of the test-piece, where it is secured, the moment of flexure is largest, decreasing linearly from that point to the mass where its value is zero.

In contra-distinction thereto the present invention purposes to produce a device, in which the strain of the test-piece by oscillations of flexure is distributed as uniformly as possible over the entire length of the test-piece. To this end the oscillatory mass engaging the free end of the test-piece has been so designed in accordance with the invention, that it is adapted to accumulate energy not only through the medium of the displacements of the centre of gravity of the mass, but also through the medium of torsions. In accordance with the invention the amount of force required for the torsional movement is advantageously enhanced so as to attain such considerable values owing to the special design of the oscillatory mass, that the force of the torsional movement is approximately of the same value as the force of translatory motion. For this purpose the mass has not been given the customary shape of a square block, but has been designed as oscillatory body, possessing e. g. the form of a double T (I), in which the masses are removed from their axis of rotation $d$ as far as possible.

Owing to this additional torsional oscillation the strain of the test-piece is composed of a linearly increasing moment and a second but invariable moment. Therefore, the new device, in contra-distinction to those customarily used so far, embodies the advantage, that the moment is variable along the test-piece to a lesser degree and that in conjunction with a suitable design of the new device the strain may even be distributed uniformly over the entire length of the test-piece.

In the drawing the invention has been represented by way of example,

Fig. 1 showing schematically the customary device in use so far, together with a graphic representation of forces appertaining thereto.

Fig. 2 represents the new form of construction schematically together with a graphic representation of forces.

Fig. 3 illustrates a preferred form of construction of the new device schematically together with a graphic representation of forces.

Fig. 4 is a front-view of the new device as example of performance.

Fig. 5 is a lateral sectional view along the line 5—5 of Fig. 4.

Fig. 6 is a vertical sectional along the line 6—6 of Fig. 5.

Fig. 7 illustrates the connections for the electric actuation.

In the test-arrangement hitherto used, as shown in Fig. 1, $a$ represents the test-piece to be tested and which is firmly secured at $b$, carrying at its free end the mass $m$. If the accelerating force presenting itself upon oscillating the mass $m$ is called P, then the moment of flexure E = P. 1. The strain showing itself in the test-piece in conjunction herewith is greatest at the point where the test-piece is secured at $b$, viz. P. 1, gradually decreasing in the direction of the free end of the test-piece down to zero. This course of the moment of flexure has been represented graphically in the right half of Fig. 1 in the form of a triangle.

In the new device is accordance with Fig. 2 the mass $m$ has been given the shape of a double T (I), with the result that, similar to a fly-wheel, the mass-parts $m'$, $m''$ are situated at the greatest possible distance from the centre of gravity $c$. With the oscillation of the test-piece $a$ an absorption principally takes place, therefore, through the torsional acceleration of the mass about the axis $d$, whilst the lateral acceleration of the centre of gravity $c$ and the absorption of force effected thereby is of a smaller value. As a result thereof the lateral acceleration will yield a moment of flexure $M_1$ which, as in the design according to Fig. 1, is variable over the entire length of the test-piece. In addition thereto must be considered a moment of flexure $M_2$ as a result of the torsional acceleration, which moment of flexure remains uniform over the entire length of the test-piece, as elucidated by the graphic representation of forces on the right of Fig. 2. The resulting moments may likewise be deduced from the graphic representation of forces beside Fig. 2 which shows that, compared with the design as per Fig. 1, the strain of the test-piece is essentially more uniform.

A perfect uniformity of strain may be attained, if the moment $M_1$ resulting from the lateral displacement is caused to be transferred by means of special auxiliary springs which are shown in Fig. 5 and described in detail later on. There remains the proper dimensioning of the auxiliary springs for the test-piece and then the moment of flexure $M_2$ will be uniformly distributed over the entire length of the test-piece as shown schematically in the left half of Fig. 3. In such a design the rotary movement of the oscillatory mass takes place round the point $d$ in Fig. 3. $d$ is placed at half the height of the test-piece, because the flexure of the test-piece corresponds to a circular track. The geometric centre of the oscillatory mass is suitably placed at $d$; in conjunction herewith it is necessary to cause $m'$ in Fig. 3 to be larger than $m''$, so as to ensure the centre of gravity $c$ remaining, as before, on a level with the end of the spring, i. e. a distance above the centre of rotation $d$.

This device renders it possible to utilize a specially advantageous actuation of the oscillatory arrangement by means of electromagnets. For the purpose of ensuring that in this arrangement the lower half of the oscillatory mass may swing past the test-piece, the mass requires to be disposed laterally to the latter. For the purpose of obviating in connection herewith any disturbing unilateral forces, it is advisable to select a symmetrical design, in which either the oscillatory mass is divided up in two halves, or vice versa, a test-piece each may be arranged on either side of the oscillatory mass.

Figs. 4–6 represents a practical form of construction of the last mentioned design of the object of the invention based upon the principle schematically represented in Fig. 3. In this case the device consists of a framelike structure, formed by two lateral uprights 1, 2 and the two horizontal stays 3, 4 and provided with two feet 5, 6 consisting of angle-iron. In the lower part of this structure two horizontal bridges 7, 8 of T-iron have been attached which serve as a rest for the clamping device. These clamping devices are each formed by one of the angle-irons 9, 10 attached to the bridge 7, 8 and a clamping plate 12 to be fastened thereto by means of screws 11.

In each of the two clamping-devices a test-piece $f^1$ and $f^2$ in most cases consisting a flat spring, of which the upper end is engaged by the oscillatory mass 15, has been secured. This oscillatory mass consists, if seen in front-view (Fig. 4), of a T-shaped body, carrying in front and behind one transverse arm 16, 17 each with the result that, seen laterally, it resembles a cross as per Fig. 5. The transverse arms 16, 17 are each provided with a vertical longitudinal slot, in which the upper ends of the two test-pieces $f^1$, $f^2$ are made to engage and where they are secured or clamped by means of screws 18.

The oscillatory mass may now, by subjecting the springs $f^1$, $f^2$ to a bending strain perform a displacement to the right and to the left on the one hand and on the other hand it will be able to describe a rotary movement round its axis $d$, as has been indicated in Fig. 4 by means of dotted lines. In view of the fact, that in this arrangement the axis of rotation is placed at half the height of the spring, the oscillatory mass will describe an almost purely rotary motion round the axis $d$ during the oscillation, a form of motion, which not only guarantees a uniform strain over the whole length of the spring, but represents also a special advantage in regard to the electro-magnetic actuation.

In order to ensure an absolute uniformity of the strain of the test-pieces, special auxiliary springs $h_1$, $h_2$ (Fig. 5) are provided for the purpose of taking up or absorbing the moment M, originated by the lateral displacement of the mass.

These auxiliary springs $h_1$, $h_2$ are not secured at the top like the test-piece $f^1$, $f^2$, but held by means of narrow ledges 19 (Fig. 5) by the transverse arms 16, 17 of the oscillatory mass. They are so dimensioned, that they are subject to an inconsiderable strain only. They may, therefore, remain permanently in the device without risk of breakage, whilst the test-piece $f^1$, $f^2$ have to be exchanged each time.

The auxiliary springs should, compared with the test-pieces, be so dimensioned, that during bending or flexure they just take up or absorb the moment $M_1$ (Fig. 2). If they are too weak, the test-pieces have to take up part of the moment $M_1$, which is increased in a downward direction, and they will break below. If, however, the auxiliary springs are too strong, they will take up or absorb part of the moment $M_2$ with the result, that the test-pieces will break at the top. The position of the fracture will, therefore, always furnish means for ascertaining as to whether the auxiliary springs have been properly dimensioned.

For the purpose of actuating this device two pairs of electro-magnets 20, 20' and 21, 21' are stationed opposite the enlarged ends 22, 23 of the oscillatory mass and attached to the rigid frame of the device by means of screws 24. These pairs of electro-magnets are now selectively so excited by the coils 25, that always two magnets placed diametrically to each other are made to act, endeavouring to attract the oscillatory mass so as to assume the one or the other oblique position. All four electro-magnets are placed fairly close to the vertical intermediate plane with the result that the line of connection of two co-ordinated magnets is practically vertical. This ensures a specially advantageous and uniform actuation, because any inconsiderable horizontal displacements which may show themselves, will not cause any essential changes in the air-gap between the oscillatory mass and the electro-magnets.

The control of the electro-magnets is effected in accordance with the connections or wiring-scheme shown in Fig. 7 in dependence of the movement of the oscillatory mass by the latter itself through the medium of a small converter 30, which is supported by a U-shaped carrier 30' attached to a traverse 31 of the structure. This converter 30 is of the so-called friction-switch type i. e. the transmission of motion is effected by friction with another moveable part. To this end the oscillatory mass is made to carry an arc 32 curved round the axis of rotation $d$; this arc establishes contact with the rearward end of the switch lever and tends to take the switch-lever with it so far in one or the other direction, until its further progress is hindered by the stops at the contacts 33, 34, thereby closing the current for the one or the other pair of magnets. Together with the reversal of motion of the oscillatory mass in its limiting position, the reversal of control is effected simultaneously each time.

The connections or wiring scheme is illustrated in Fig. 7. The supply of current is taken from the feeder 40, 41 via the fuse 42 and the main-switch 43 attached to a potentiometer 44, to one end of which the pair of magnets 20, 20' has been connected and to the other end the pair of magnets 21, 21', whilst the centre of the potentiometer 44 is connected with the point of rotation of the switch lever 30 via a regulable resistance 45. The switch lever 30 which, as will be seen from Fig. 6, is moved to and fro by the oscillatory mass, alternately acts thereby together with the two contacts 33, 34, which each appertain to one of the two pairs of magnets. Parallel to each point of interruption $a$ condenser 46, 47 has been positioned in order to reduce the formation of sparks. The same effect, moreover, is exercised by the two halves of the potentiometer 44, which are connected in parallel to the magnets. To one part of the series resistance 45 an electric counting device 48, of a kind known in itself, has been connected in parallel. This counting device which is actuated by the current impulses after the style of a synchronous motor renders it possible to ascertain from its number of revolutions the number of oscillations performed by the oscillatory mass until the fracture of the test-piece.

For the purpose of attaining an automatic interruption of the actuation in conjunction with such a fracture, the two sides of the oscillatory mass have been equipped with an auxiliary contact 50, 51 each. If now the amplitude grows beyond a certain limit owing to the fracture of a test-piece or for any other reasons, the oscillatory mass will strike against one of the auxiliary contacts 50, 51, thereby closing the current of the releasing-coil 52, causing the main-switch 43 to be actuated and thus interrupting the working of the device. The resistance 53 serves for limiting the auxiliary current.

I claim:

1. Device for testing constructional material by oscillations of flexure of resilient test-pieces which comprises means for securing a test-piece at one end to a fixed support, and an oscillatory mass carried at the other end of the test-piece and so arranged with respect thereto as to act as a torsional oscillatory mass in such a manner that the strain of the test-piece through the torsion of the oscillatory mass will equal at least that exercised by the displacement of the oscillatory mass.

2. Device in accordance with claim 1 wherein the oscillatory mass and test-piece are disposed symmetrically on either side of the intermediate plane of oscillations in such a manner, that their paths of oscillations overlap each other.

3. Device in accordance with claim 2 wherein the oscillatory mass is supported at each side by a test-piece.

4. Device in accordance with claim 1 wherein two test-pieces are mounted to stand upright and support the oscillatory mass.

5. Device in accordance with claim 1 wherein the oscillatory mass is T-shaped.

6. Device in accordance with claim 1 wherein the oscillatory mass projects at its ends longitudinally beyond the ends of the test-piece.

7. Device in accordance with claim 1 wherein electro-magnetic means is provided for actuating the oscillatory mass, the same comprising electro-magnets disposed on opposite sides of the ends of the oscillatory mass.

8. Device in accordance with claim 1, characterized thereby, that the test-piece is coupled to the oscillatory mass so far above the center of said mass, that its torsion takes place round an axis which is situated at about half the height of the test-piece.

9. Device in accordance with claim 1 wherein auxiliary springs are provided in addition to the test-pieces proper which are held loosely engaged at their upper ends with the oscillatory mass, so that during the oscillation they can take up or absorb primarily one force only.

10. Device in accordance with claim 1 wherein auxiliary springs are provided for flexure by movements of the mass, which auxiliary springs are so dimensioned in proportion to the test-pieces, that they take up or absorb the moment originated by the displacement of the centre of gravity, so that the test-pieces will have a moment invariable along their length, produced by the torsion of the oscillatory mass.

11. Device in accordance with claim 1 wherein electro-magnets are employed to actuate the mass and wherein current to the magnets is governed by a friction-switch which effects the connection in accordance with the direction of velocity of the oscillatory mass.

In testimony whereof I affix my signature.

GERD STIELER v. HEYDEKAMPF.